UNITED STATES PATENT OFFICE.

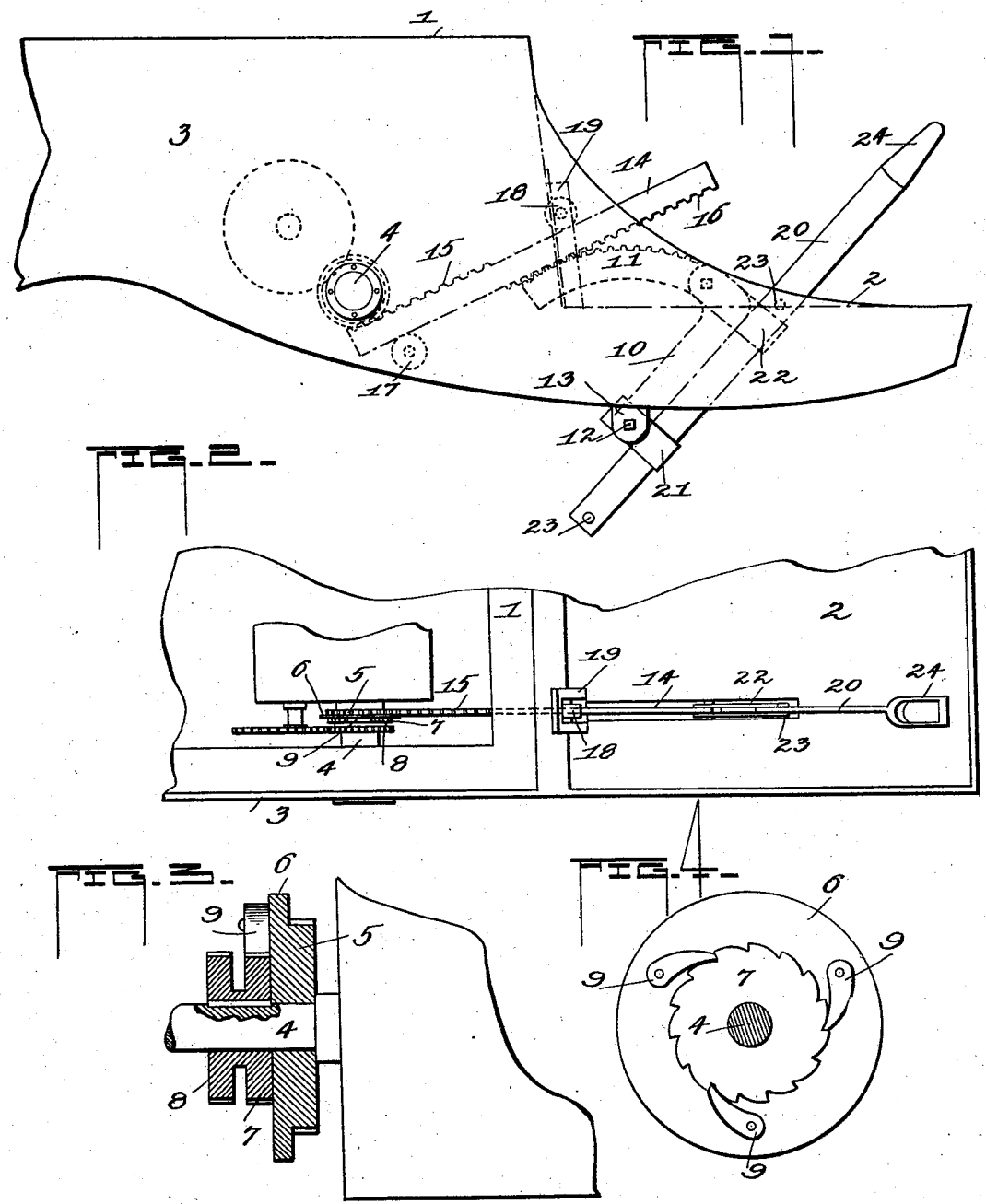

JACOB BALDNER, OF XENIA, OHIO.

STARTING MECHANISM.

SPECIFICATION forming part of Letters Patent No. 694,454, dated March 4, 1902.

Application filed January 21, 1901. Serial No. 43,994. (No model.)

*To all whom it may concern:*

Be it known that I, JACOB BALDNER, a citizen of the United States, residing at Xenia, in the county of Greene and State of Ohio, have invented certain new and useful Improvements in Starting Mechanism; and I do hereby declare that the following is a full, clear, and exact description of the invention, which will enable others skilled in the art to which it appertains to make and use the same.

This invention relates to a device for starting hydrocarbon-engines, and the particular application herein is to motor-vehicles employing a hydrocarbon engine or engines as the permanent power device.

The mechanism employed by me consists in the combination of parts hereinafter more particularly described and pointed out in detail in the specification and claimed in the appended claims.

In order to make my invention more clear, I refer to the accompanying drawings, in which similar numerals indicate similar parts throughout the views, and in which—

Figure 1 shows a side elevation of a portion of the forward end of a vehicle-body, showing my device applied thereto. Fig. 2 is a plan view of Fig. 1. Figs. 3 and 4 show enlarged details of certain parts of the device.

In the drawings I have shown for convenience the forward end of a vehicle having the seat portion 1 and the floor 2. In the main body of the vehicle and beneath the seat portion are arranged to be carried suitable engine parts, the shaft of which, referring to it as 4, is shown in full lines and extends into the side 3 of the body of the vehicle.

On the engine-shaft 4 is carried positive mechanism actuated through suitable means for imparting preliminary motion to the engine or engines. 5 is a pinion loosely carried on the shaft 4 and is provided with the flange 6.

7 refers to a ratchet, and 8 a pinion which is integral with the ratchet, and the same are keyed or by other suitable means made positive with the engine-shaft 4, so that any movement of the ratchet will give a corresponding movement to the engine-shaft.

9 represents suitable pawls, of which are used a series carried on the outer face of the flange 6 in such a manner as to engage the ratchet-teeth of the ratchet 7.

10 refers to a segmental rack having the rack portion at 11, and the same has a pivotal connection at 12 with the hanger-plate 13.

14 is a rack-bar having a rack portion at 15 on its upper face on the inner end portion and a rack portion on its lower face near the outer end. The inner rack 15 is arranged to intermesh with the teeth of the pinion 5, which is loosely carried on the engine-shaft, and the rack portion 16 of the rack-bar 14 is arranged to intermesh with the teeth 11 of the segmental rack 10.

To insure that the teeth of the rack-bar 14 will engage, respectively, with the pinion 5 and the segmental rack 10, I have provided the rollers 17 and 18. These rollers act as guides and supports for the bar 14, the roller 17 is supported at a suitable point in the vehicle, so as to have a bearing relation with the lower rear face of the bar 14, and the roller 18 is suitable journaled in the frame 19, so as to have a bearing relation with the upper outer face of the bar 14. There are provided suitable slots in the body of the vehicle, in which are carried and operated the segmental rack 10 and the component parts and the rack-bar 14. In the successful operation of these parts it is desirable that the parts be so arranged and constructed that the operator may have a great deal of leverage in actuating the parts already described, and in this connection I have shown an extensible lever 20, which is connected with the segmental rack 10 by means of the straps 21 and 22, in which the same has an extensible bearing relation, and a common pivotal center is provided for the lever 20 and the segmental rack 10, (above designated as 12.) Suitable lugs, as at 23, are provided on the lever 20, which will limit the extensible movement of the lever in either direction, and to permit the operator to handle the lever I have provided the handhold 24.

In the operation of the device the parts having been arranged substantially as shown in Fig. 1 of the drawings they are in position so that the preliminary movement of the engine parts will be as follows: The lever 20 will be extended out its full length and the operator will draw the same rearwardly, which movement will cause the segmental rack to thrust the rack-bar 14 inwardly, and because of the engagement of the rack-teeth 15 with the loose pinion 5 the same will be rotated and such rotation will be imparted to the engine-shaft 4 through the pawls 9 to the ratchet 7, which is fast on the shaft, such rotation of the engine-shaft causing the desired necessary preliminary movement of the engine parts. After the movement of the parts such as has been described the parts may be left in such position, which is just the opposite that shown in Fig. 1, as by throwing the rack-bar 14 a sufficient distance inwardly the rack-teeth 15 thereof will pass beyond the point of engagement with the pinion 5, which will disengage the parts from connection with the mechanism of the engine-shaft, and the lever 20, dropped into its normal position, will rest against the front portion of the seat. To resume the preliminary operation, the lever 20 is extended and pushed forward, which will cause the parts connecting with the engine-shaft to assume a position substantially as is shown in Fig. 1, and the operation of the parts may be repeated, as has been described.

It is obvious that various changes may be made in the detail construction of the parts and in the location and operation of the same without departing from the spirit of the invention herein described.

Having thus fully described my invention, what I claim, and desire to secure by Letters Patent of the United States, is—

1. A starting device, consisting of a pinion loosely mounted on an engine-shaft, connection between the pinion and a ratchet having a positive connection with said shaft, a segmental rack, and means for actuating the rack for transmitting motion to the loose pinion on the engine-shaft through mechanism interposed between the pinion and segmental rack, substantially as described.

2. In a starting device for motor-vehicles, a pinion loosely carried on the power-shaft of the vehicle, a rack engaging the pinion, a segmental rack engaging the aforesaid rack, an extensible lever for actuating the segmental rack, and suitable means having a positive connection with the power-shaft arranged to be actuated by the pinion on said power-shaft, substantially as described.

3. In a starting device, the combination with the engine-shaft of a vehicle, of a segmental rack having a pivotal connection on the vehicle-bed, a lever having an extensible connection with the segmental rack, means interposed between the engine-shaft and segmental rack whereby when said rack is actuated a rotary movement will be imparted to the engine-shaft, substantially as described.

4. The combination with the driving parts of a vehicle, of an engine-shaft, a flanged pinion loosely carried on the shaft and carrying a series of pawls engaging with a ratchet having a positive connection with said shaft, a rack-bar capable of reciprocation having on its upper face a cog-rack engaging with a loose pinion on the shaft, and having a cog-rack on its lower face engaging with means for reciprocating the same for imparting rotary motion to its connecting means on the engine-shaft, substantially as described.

5. In a starting device for motor-vehicles, the combination with the driving mechanism therein, of an engine-shaft, a flanged pinion having a loose connection with the shaft, a ratchet-wheel carried adjacent to the pinion and having a positive connection with the shaft, pawls engaging the ratchet and carried by the flanged pinion, a reciprocating cog-rack suitably supported and having oppositely-arranged cog-faces, one of which has a meshing relation with the loose pinion and the other having a meshing relation with an auxiliary pivoted rack and a lever for swinging the pivoted rack, substantially as specified.

6. In a starting device for motor-vehicles, the combination with the power driving-shaft, a loose pinion carried on said shaft, a reciprocating bar having a cog-rack on its upper and lower faces at opposite ends, the inner teeth having a meshing relation with the loose pinion and the outer lower rack having a meshing relation with a swinging rack, and supporting-rollers for the reciprocating rack, an extensible lever connected with the swinging rack suitably pivoted for actuating the swinging and reciprocating rack, and means having a positive connection with the shaft actuated by the loose pinion when the same is rotated by the reciprocating bar, substantially as described.

7. In a starting device, the combination with a fixed and loose pinion on the engine-shaft, of the rack 14, having double cogged faces, the rack 10, pivoted at 12, and the lever 20, sliding in yokes 21, and 22, and arranged to transmit a reciprocating movement to the rack 14, in the manner and for the purpose described.

8. In a seat starting device, the combination with a fixed and loose mechanism on the engine-shaft, the rack 14, and the segmental rack 10, means for holding the rack 14, in engagement with the mechanism on the engine-shaft and with the rack 10, a lever 20, for actuating the aforesaid racks, and a common pivotal point 12, for the lever and segmental rack 10, all arranged substantially in the manner and for the purpose described.

In witness whereof I affix my signature in presence of two witnesses.

JACOB BALDNER.

Witnesses:
W. L. MILLER,
J. B. FLEMING.